UNITED STATES PATENT OFFICE.

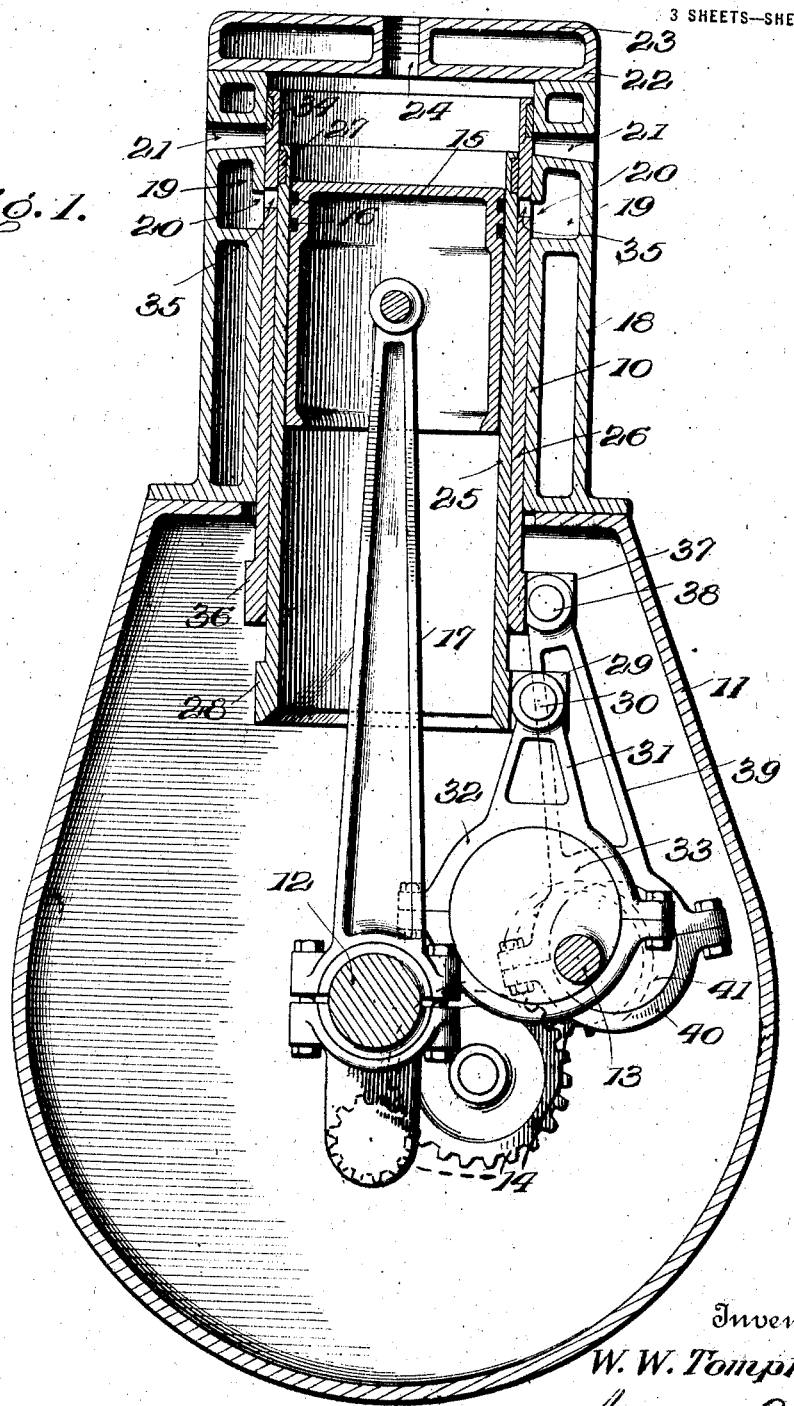

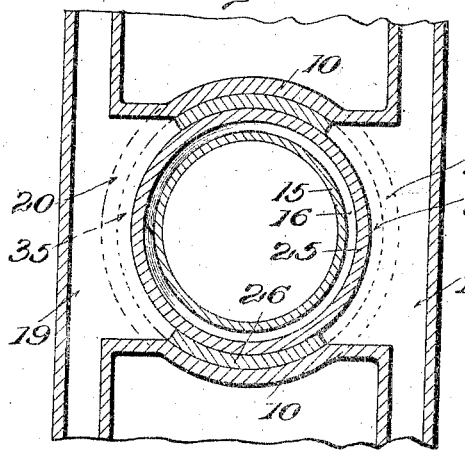
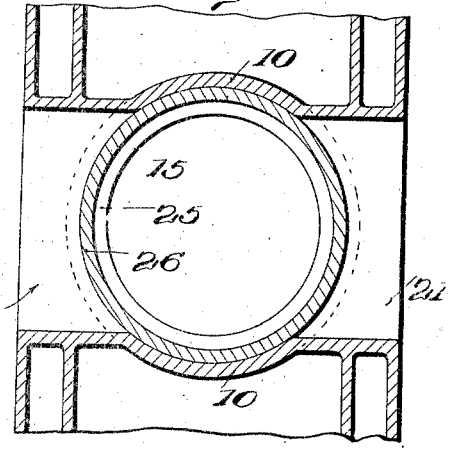
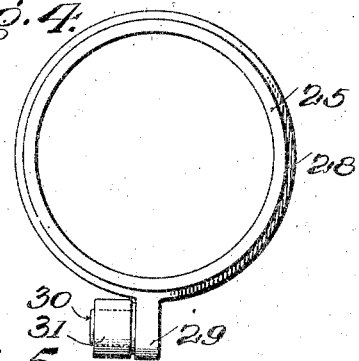
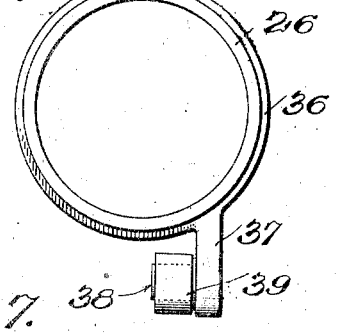
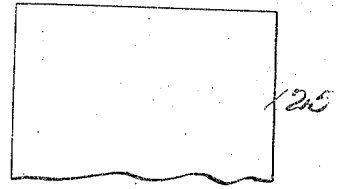
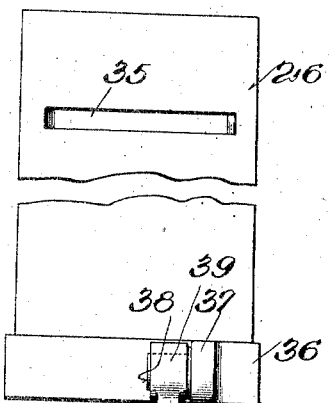

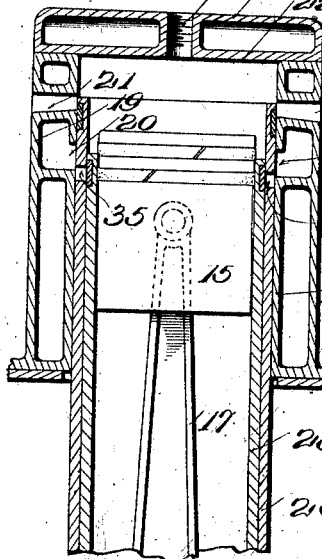
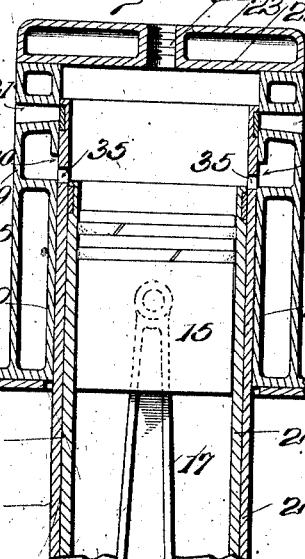
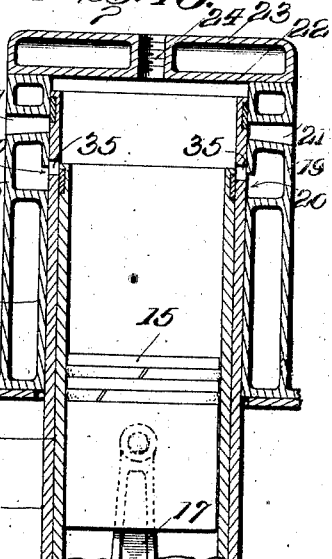
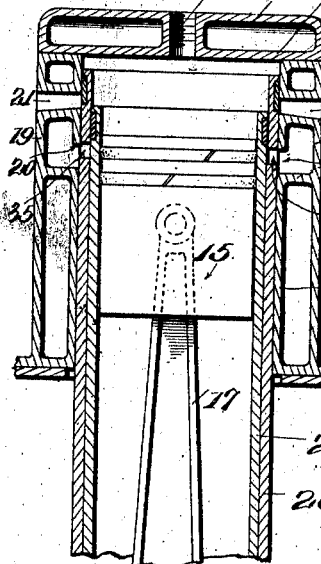
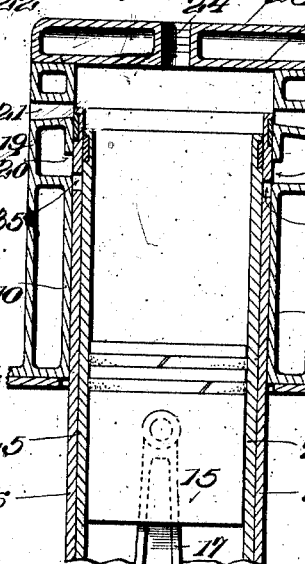
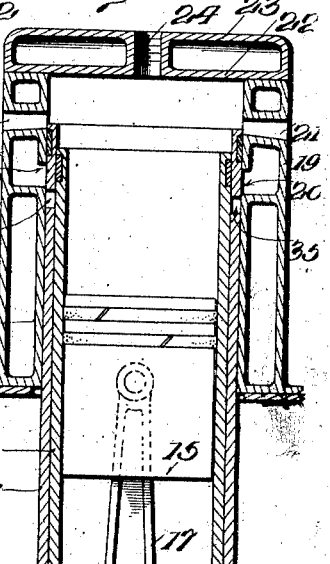

WALLACE W. TOMPKINS, OF NEW ALBANY, INDIANA.

INTERNAL-COMBUSTION ENGINE.

1,334,684.  Specification of Letters Patent.  Patented Mar. 23, 1920.

Application filed September 7, 1918. Serial No. 253,077.

*To all whom it may concern:*

Be it known that I, WALLACE W. TOMPKINS, citizen of the United States, residing at New Albany, in the county of Floyd and State of Indiana, have invented certain new and useful Improvements in Internal-Combustion Engines, of which the following is a specification.

This invention relates to an improved internal combustion engine of the four-cycle type and has as its primary object the provision of an engine embodying a practical and efficient sleeve valve mechanism for controlling the intake and exhaust of the engine cylinders.

The invention has as a further object to provide a construction wherein the cylinders will be formed with flat heads so that a common removable head block may be employed for all of the cylinders and wherein the sleeve valves employed will function independently of the head block to control the intake and exhaust of the cylinders.

And a still further object of the invention is to provide an engine wherein the cylinders will be provided with double intake ports through which the fuel mixture will be admitted over the tops of the intake valves to thereby permit free induction of the fuel mixture into the cylinders and wherein the cylinders will also be formed with double exhaust ports through which the exhaust gases will be permitted to flow over the tops of the exhaust valves to also permit a correspondingly free discharge of said gases.

Other and incidental objects will appear during the course of the detailed description of the invention. In the drawings, wherein I have illustrated the preferred embodiment of the invention, and wherein similar reference characters designate corresponding parts throughout the several views:

Figure 1 is a vertical sectional view taken through a cylinder of an engine embodying my invention, Fig. 2 is a transverse sectional view taken at the plane of the intake ports of the cylinder, Fig. 3 is a similar view taken at the plane of the exhaust ports of the cylinder, Fig. 4 is a plan view of the intake valve, Fig. 5 is an elevation of the intake valve, Fig. 6 is a plan view of the exhaust valve, Fig. 7 is an elevation of the exhaust valve showing the intake ports therethrough, and Figs. 8 to 13 inclusive are diagrammatic sectional views illustrating the different positions of the intake and exhaust valves throughout a complete cycle of the engine.

In carrying the invention into effect I employ a working cylinder 10 which is mounted upon a crank case 11. Journaled through the crank case is a crank shaft 12 above and at one side of which is arranged an eccentric shaft 13 also journaled through the crank case. The shaft 13 is rotated from the crank shaft by a plurality of gears 14 or other approved means, turning the shaft 13 with respect to the crank shaft at a ratio of one to two. Mounted to reciprocate within the cylinder 10 is a piston 15 equipped adjacent its upper end with suitable sealing rings 16 and connected with the crank shaft 12 by the usual connecting rod 17. Surrounding the working cylinder is a water jacket 18 from which is divided intake manifolds 19 at opposite sides of the cylinder. Leading from these manifolds into the cylinder are diametric intake ports 20. The ports 20 are, as shown in detail in Fig. 2 of the drawings, elongated to extend circumferentially of the cylinder and may be of any approved length. Opening through the water jacket from the cylinder above the intake manifolds and arranged at opposite sides of the cylinder, are diametric exhaust ports 21. These exhaust ports are also elongated as shown in detail in Fig. 3, to extend circumferentially of the cylinder and may be of any approved length. Closing the cylinder at its upper end is a flat head 22 which may be removably secured to the cylinder in any well known manner. This head is provided with a water jacket 23 communicating with the jacket of the cylinder and is formed axially of the cylinder with a suitable spark plug orifice 24. As will be seen, the head 21 may be formed as an elongated removable head block closing all of the engine cylinders at their upper ends in the well known manner.

Snugly surrounding the piston 15 and slidably receiving the said piston, is an intake sleeve valve 25, and telescopically receiving this valve is an exhaust sleeve valve 26 slidably fitting snugly within the working cylinder. The valve 25 is open at its ends and is equipped adjacent its upper extremity with an annular packing 27 which may, if desired, be in the form of a piston ring. Formed on the lower extremity of said valve is an annular reinforcing band 28 and projecting from this band at one side of the cylinder is an arm 29 upon which is formed a laterally projecting trunnion 30. Engaging at one end with this trunnion is a connecting rod 31 formed at its opposite end with a sectional eccentric strap 32 engaging around an intake eccentric 33 upon the shaft 13. The sleeve valve 26, like the valve 25, is also open at its ends, being somewhat shorter than the latter valve. Adjacent its upper end this valve 26 is equipped with an annular packing 34 similar to the packing 27 and below this packing is formed, at opposite sides thereof, with diametric intake ports 35. The ports 35 are, as shown in Fig. 2, elongated to extend circumferentially of the valve and are adapted to register with the intake ports 20. In this connection it is to be observed that the packing 27 of the intake valve is of a width to overlap the intake ports 35 while the packing 34 of the exhaust valve is of a width to overlap the exhaust ports 21. Formed on the lower end of the valve 26 is a reinforcing band 36 from which projects at one side of the cylinder, an arm 37 similar to the arm 29 of the valve 25. Formed on said arm is a lateral trunnion 38 to which is connected at one end, a connecting rod 39. This rod is somewhat longer than the connecting rod 31 and the opposite end thereof is formed with a sectional eccentric strap 40 engaging around an exhaust eccentric 41 upon the eccentric shaft 13. As particularly brought out in Figs. 4 to 7 inclusive of the drawings, the connecting rods 31 and 39 are equally displaced laterally from a plane passing midway between the eccentrics 33 and 41.

As will now be clear, the sleeve valves 25 and 26 will be reciprocated from the eccentric shaft and will travel at one-half the rate traveled by the piston 15. Therefore, the piston will make four strokes while each of the valves will make but two strokes. As clearly shown in Fig. 1 of the drawings, the eccentric 33 is somewhat larger than the eccentric 41, the eccentric 41 leading the former eccentric by substantially sixty degrees. These eccentrics are so proportioned in diameter that the exhaust valve travels at two-thirds the rate traveled by the intake valve and, of course, the intake valve will have a correspondingly longer stroke than the exhaust valve. However, it is to be noted that the said valves are so coupled with the eccentric shaft that the intake valve will not interfere with the movement of the exhaust valve and will always remain lower than the latter valve.

The upper ends of these valves will therefore form a stepped wall for the firing chamber of the working cylinder. This construction provides an arrangement whereby the facility of cooling is greatly enhanced, while, at the hottest part of the firing chamber of the cylinder, two thicknesses only of metal will lie between said chamber and the cooling jacket. In order that the intake ports 20 may be opened and closed during a single stroke of the piston, the said ports are of a height representing one-fourth of the length of the stroke of the intake valve 25. Furthermore, the bottom edges of these ports are located in the plane touched by the upper end of the intake valve when the said valve is at the bottom of its stroke. Consequently, the intake ports will be open during the interval of one-fourth of each cycle of the valve while, throughout the remaining three-fourths of the cycle or during the completion of three strokes of the piston, the upper end of the valve will be above the ports. The intake ports 35 in the exhaust valve 26 are of a height representing one-fourth of the length of the stroke of this valve. However, since the ports 20 are of a height representing somewhat more than a fourth of the length of the stroke of the exhaust valve, the ports 35 will be in register with the ports 20 during an interval somewhat greater than a fourth of each cycle of the exhaust valve. Therefore, even though the eccentric 41 of the exhaust valve leads the eccentric 33 of the intake valve, the registration of the ports 20 and 35 will be prolonged sufficiently to permit the intake valve, by reason of the fact that it travels faster than the exhaust valve, to uncover the ports 35 while the ports 20 and 35 are in communication with each other. The exhaust ports 21 are also of a height representing one-fourth of the length of the stroke of the exhaust valve so that these ports will thus be opened and closed during a single stroke of the piston. Furthermore, like the intake ports, the bottom edges of the exhaust ports 21 are located in the plane touched by the upper end of the exhaust valve when said valve reaches the bottom of its stroke. Consequently, these ports will be open during the interval representing one-fourth of each cycle of the exhaust valve while, throughout the other three-fourths of the cycle or during the completion of three strokes of the piston, the upper end of the valve will be above the said ports. In this connection it is to be observed that while I have indicated that the intake ports 20 are of a height representing one-fourth of the length of the stroke of the intake valve and the exhaust ports are of a height representing one-fourth of the length of the stroke of the exhaust valve, still, it will be seen that the height of these ports may be varied within practical limits for varying the degree at which the intake and exhaust valves respectively will open and close the said ports. Further, the stroke of the valves may, of course, be set ahead to assist in accurate timing.

By referring now more particularly to Figs. 8 to 13 of the drawings, it is believed that the operation of my improved engine will be readily understood. Fig. 8 shows the position of the intake and exhaust valves 25 and 26 at the upper dead center of the piston previous to its intake stroke. At this time the intake valve is moving downwardly while the exhaust valve is moving upwardly, closing of the exhaust ports 21 being preferably effected at about five degrees after the upper dead center and opening of the intake ports 20 through the ports 35 being effected at about ten degrees after said dead center. In Fig. 9, the piston is shown at about one-fourth the way down on its intake stroke. At this time the exhaust ports have, of course, been closed, while the intake valve, continuing in its downward movement, has opened the intake ports 20 to permit the induction of a fuel charge through the ports 35 at opposite sides of the cylinder from the intake manifolds 19. It is to be particularly noted that the inrushing fuel charge will thus be admitted over the top of the intake valve, so that the said valve will in no way hamper the inward flow of the mixture. In Fig. 10, the piston is shown at the bottom of the intake stroke. At this time, the intake valve is moving upwardly to close the intake ports 20. The exhaust valve is also moving upwardly but since the intake valve travels faster than the exhaust valve, the intake valve will overtake the exhaust valve and thus accomplish the sealing of the intake ports at the proper time. In Fig. 11, the piston is shown at the completion of the compression stroke. At this time, the exhaust valve is moving downwardly. However, attention is directed to the fact that the exhaust valve well overlaps the exhaust ports so that the said ports are effectually sealed for retaining the compression of the fuel charge and preventing leakage of the exploded gases when the said charge is ignited. In Fig. 12, the piston is shown at the bottom of the firing stroke. At this time, the exhaust valve has moved down to uncover the exhaust ports, the valve having opened at about forty-five degrees before the bottom dead center of the firing stroke so that a free and unobstructed passage of the burnt gases from the cylinder at opposite sides thereof will be permitted. As in the instance of the intake valve, the exhaust valve will thus be lowered for discharge of the exhaust gases over the top of the valve so that said exhaust valve will in no way impede the scavenging of the firing chamber. In Fig. 13, the piston is shown at about one-fourth the way up on its exhaust stroke. At this time the exhaust valve is again moving upwardly to close the exhaust ports while the intake valve is again moving downwardly to open the intake ports, thus completing the cycle.

It will, therefore, be seen that I provide a construction wherein the sleeve valves will function to control the intake and exhaust of the cylinder entirely independent of the cylinder head. The necessity for any superstructure upon the head is thus eliminated and the use of a flat head permitted. Furthermore, it will be seen that by employing double intake ports, free induction of the fuel charge into the cylinder at opposite sides thereof will be permitted while, by also employing double exhaust ports, a correspondingly free discharge of exploded gases from the cylinder at opposite sides thereof, will also be permitted.

Having thus described the invention, what is claimed as new is:

1. In engine construction, a working cylinder having intake and exhaust ports, a head for the cylinder, a piston mounted to reciprocate within the cylinder, and intake and exhaust valves fitting one within the other within the cylinder and surrounding said piston, the valves being open at their upper ends and slidable with respect to each other for controlling independently of the head the intake and exhaust through the open upper ends of the respective valves and through said ports respectively.

2. In engine construction, a working cylinder having intake and exhaust ports, a piston mounted to reciprocate within the cylinder, intake and exhaust valves fitting one within the other within the cylinder and surrounding said piston, the valves being slidable with respect to each other for controlling the intake and exhaust through said ports respectively over the tops of the respective valves, and means operatively coupled with the piston for sliding said valves one at a greater speed than the other whereby the intake valve will overtake the exhaust valve for properly closing the intake port.

3. In engine construction, a working cylinder having intake and exhaust ports, a piston mounted to reciprocate within the cylinder, intake and exhaust valves fitting one within the other within the cylinder and surrounding said piston, the exhaust valve being provided with an intake port therethrough adapted to register with the intake port of the cylinder and the valves being slidable with respect to each other for controlling the intake and exhaust through the registering intake ports and the exhaust port respectively over the tops of the respective valves, and means operatively coupled with the piston for sliding the valves one at a greater speed than the other whereby the intake valve will overtake the exhaust valve and properly close the registering intake ports.

4. In engine construction, a working cylinder having intake and exhaust ports, a piston mounted to reciprocate within the cylinder, and intake and exhaust valves slidably fitting one within the other within the cylinder to surround the piston and movable with respect to each other for controlling the intake and exhaust through said ports respectively over the tops of the respective valves, the bottom edges of the intake and exhaust ports being respectively located in a plane touched by the upper end of the intake and exhaust valves respectively when each of said valves is at the bottom of its stroke.

5. In engine construction, a working cylinder having intake and exhaust ports, a piston mounted to reciprocate within the cylinder, and intake and exhaust valves fitting one within the other within the cylinder and surrounding said piston for movement with respect to each other to control the intake and exhaust through said ports respectively over the tops of the respective valves, the valves being open at their upper ends and one of the valves having its upper end constantly lower than the upper end of the other valve whereby to provide a stepped wall within the firing chamber of the cylinder.

6. The combination with a cylinder having intake and exhaust ports, a head closing the cylinder, and a piston movable in the cylinder, of an outer sleeve valve controlling the exhaust through the exhaust port over the top of the valve, an inner sleeve valve controlling the intake through the intake port over the top of the valve, said valves being arranged one within the other within the cylinder around the piston and being movable wholly below the plane of the head, and means for operating said valves.

In testimony whereof I affix my signature.

WALLACE W. TOMPKINS. [L. S.]